US009231255B2

(12) United States Patent
Uematsu et al.

(10) Patent No.: US 9,231,255 B2
(45) Date of Patent: Jan. 5, 2016

(54) LITHIUM-ION SECONDARY BATTERY

(71) Applicant: Kabushiki Kaisha Toshiba, Minato-ku (JP)

(72) Inventors: Ikuo Uematsu, Kanagawa-ken (JP); Naoya Hayamizu, Kanagawa-ken (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 137 days.

(21) Appl. No.: 14/202,003

(22) Filed: Mar. 10, 2014

(65) Prior Publication Data

US 2015/0004496 A1    Jan. 1, 2015

(30) Foreign Application Priority Data

Jun. 26, 2013 (JP) ................ 2013-134098

(51) Int. Cl.
*H01M 4/78* (2006.01)
*H01M 10/0525* (2010.01)
*H01M 2/16* (2006.01)

(52) U.S. Cl.
CPC ............. *H01M 4/78* (2013.01); *H01M 2/1673* (2013.01); *H01M 10/0525* (2013.01)

(58) Field of Classification Search
CPC .. H01M 4/78; H01M 2/1673; H01M 10/0525
See application file for complete search history.

(56) References Cited

U.S. PATENT DOCUMENTS

| | | | | |
|---|---|---|---|---|
| 5,162,178 A | * | 11/1992 | Ohsawa | H01M 4/13 429/213 |
| 2009/0017380 A1 | * | 1/2009 | Honda | H01M 2/16 429/218.1 |
| 2013/0071751 A1 | * | 3/2013 | Tajima | H01G 11/26 429/231.8 |
| 2013/0143090 A1 | * | 6/2013 | Hosoya | H01M 10/0587 429/94 |

FOREIGN PATENT DOCUMENTS

JP         2011-238589         11/2011

* cited by examiner

*Primary Examiner* — Stewart Fraser
(74) *Attorney, Agent, or Firm* — Oblon, McClelland, Maier & Neustadt, L.L.P.

(57) ABSTRACT

According to one embodiment, a lithium-ion secondary battery includes a first current collector, a first layer, and a separator. The first current collector has a plurality of first recesses on a surface of the first current collector. The first layer is provided on the first current collector. The layer includes a first active material body, a first binder, and a first conductive body. The separator is provided in the first recesses via the first layer and including a fiber.

16 Claims, 4 Drawing Sheets

LITHIUM-ION SECONDARY BATTERY

CROSS-REFERENCE TO RELATED APPLICATIONS

This application is based upon and claims the benefit of priority from Japanese Patent Application No. 2013-134098, filed on Jun. 26, 2013; the entire contents of which are incorporated herein by reference.

FIELD

Embodiments described herein relate generally to a lithium-ion secondary battery.

BACKGROUND

In a lithium-ion secondary battery, an active material body, a conductive agent, and a binder are provided in a layer form on a current collector. The active material body, the conductive agent, the binder, and the current collector constitute a positive electrode or a negative electrode. In the lithium-ion secondary battery, performance as a battery is obtained by the movement of lithium ions ($Li^+$) between the electrodes and the behavior of electrons flowing through the current collector.

In a common lithium-ion secondary battery, the positive electrode or the negative electrode is in a flat shape. In such a case, depending on the position in the electrode, there is a case where the difference between the speed at which the lithium ion arrives at the active material body and the speed at which the electron arrives at the current collector is significant. To use the electrode with good efficiency in the charging and discharging of the lithium-ion secondary battery, it is necessary to improve such a malfunction.

DETAILED DESCRIPTION

Figure 1A:
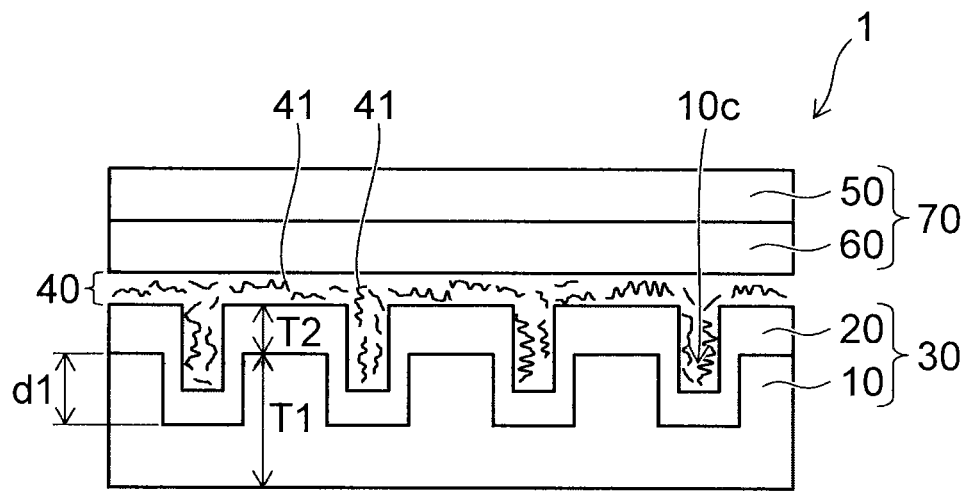
FIG. 1A is a schematic cross-sectional view of a lithium-ion secondary battery according to a first embodiment.

According to one embodiment, a lithium-ion secondary battery includes a first current collector, a first layer, and a separator. The first current collector has a plurality of first recesses on a surface of the first current collector. The first layer is provided on the first current collector. The layer includes a first active material body, a first binder, and a first conductive body. The separator is provided in the first recesses via the first layer and including a fiber.

Various embodiments will be described hereinafter with reference to the accompanying drawings. In the following description, identical components are marked with the same reference numerals, and a description of components once described is omitted as appropriate.

First Embodiment

Figure 1B:
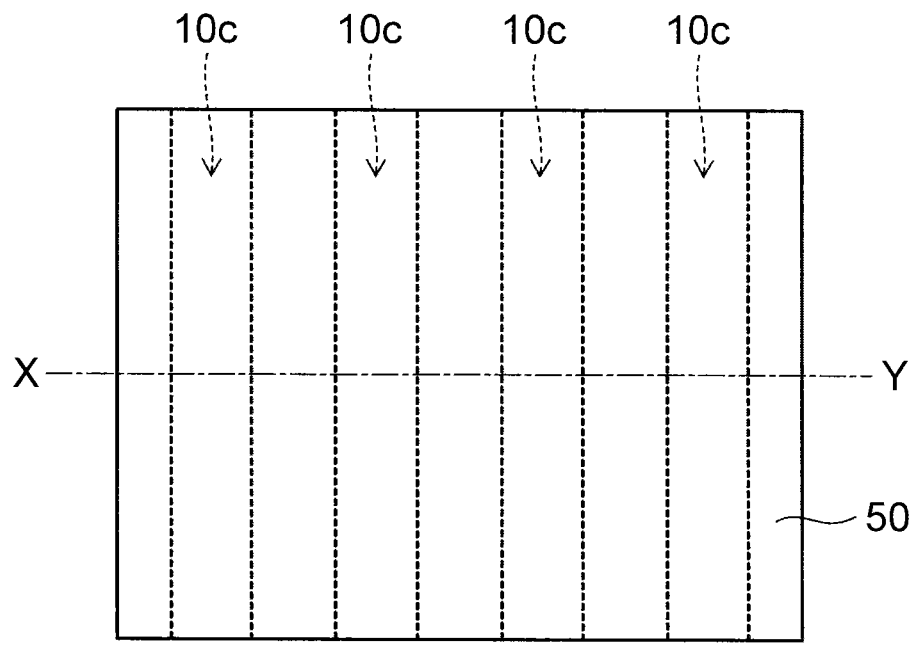
FIG. 1B is a schematic plan view of the lithium-ion secondary battery according to the first embodiment.

FIG. 1A is a schematic cross-sectional view of a lithium-ion secondary battery according to a first embodiment, and FIG. 1B is a schematic plan view of the lithium-ion secondary battery according to the first embodiment. FIG. 1A shows the X-Y cross section of FIG. 1B.

Figure 2:
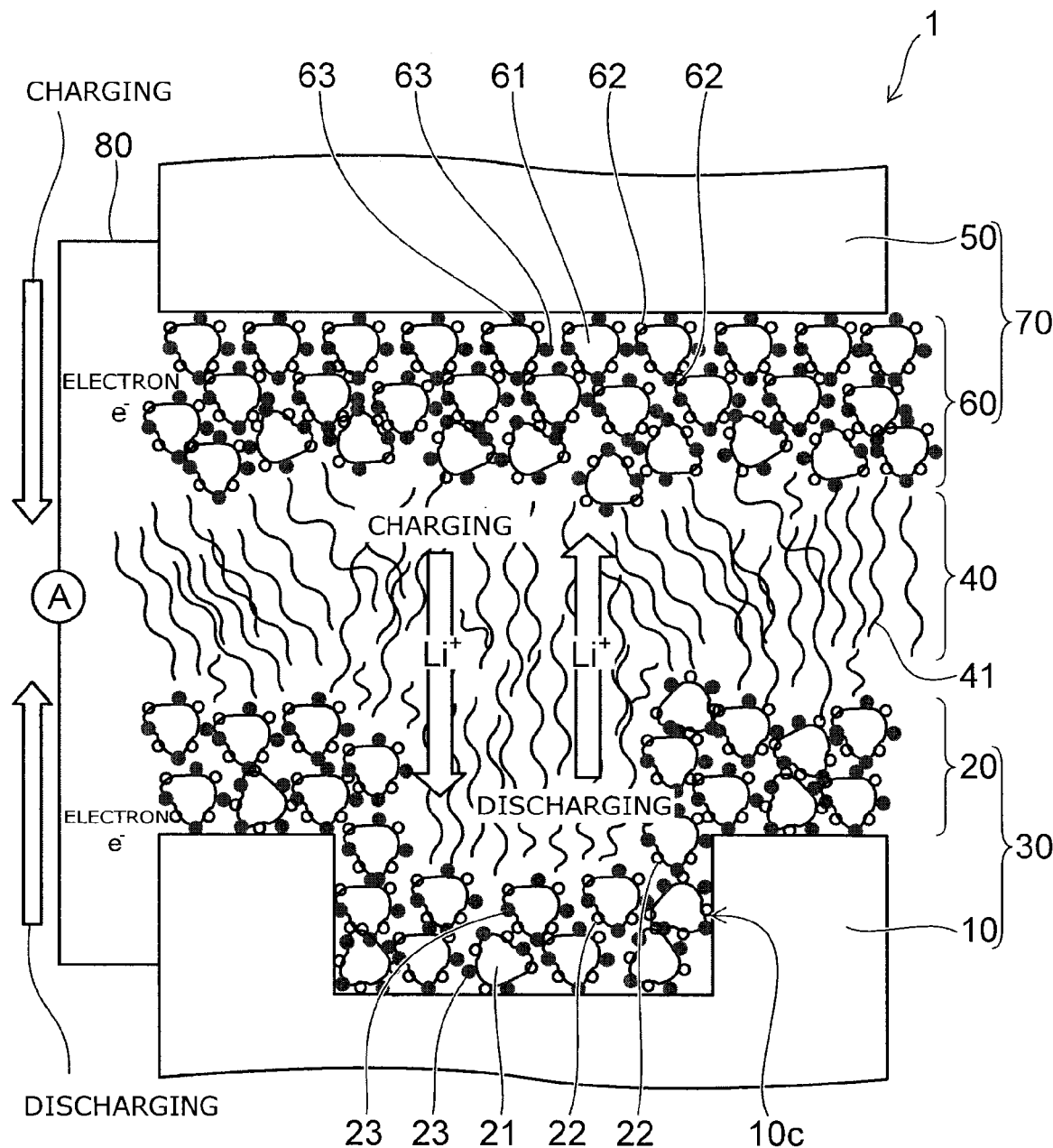
FIG. 2 is a schematic cross-sectional view of the lithium-ion secondary battery according to the first embodiment, and is an enlarged view of FIG. 1A.

FIG. 2 is a schematic cross-sectional view of the lithium-ion secondary battery according to the first embodiment, and is an enlarged view of FIG. 1A.

A lithium-ion secondary battery 1 according to the first embodiment includes a current collector 10 (a first current collector), a first layer 20, and a separator 40. A unit including the current collector 10 and the first layer 20 is taken as a negative electrode 30, for example. Other than these, the lithium-ion secondary battery 1 includes a current collector 50 (a second current collector) and a second layer 60. A unit including the current collector 50 and the second layer 60 is taken as a positive electrode 70, for example. An electrolyte (an electrolytic solution) is provided between the negative electrode 30 and the positive electrode 70.

The current collector 10 has a plurality of recesses 10c (first recesses) on its surface. The plurality of recesses 10c are formed by the imprint method, the press method, the transfer method, the gravure method, or the like, for example. By the plurality of recesses 10c being provided, the surface of the current collector 10 has a concave-convex configuration. When the surface of the current collector 10 is viewed perpendicularly to the surface of the current collector 10, the pitch of the plurality of recesses 10c is 10 mm or less. For example, the pitch of the plurality of recesses 10c is 2 mm or less. When the surface of the current collector 10 is viewed perpendicularly to the surface of the current collector 10, each of the plurality of recesses 10c is in a linear shape.

The depth d1 of the plurality of recesses 10c is 10% or more of the total thickness T3 of the thickness T1 of the current collector 10 and the thickness T2 of the first layer 20. The thickness of the current collector 10 is 40 μm (micrometers) or less, for example. The thickness of the first layer 20 is 40 μm or less, for example.

Each of the plurality of recesses 10c does not need to be in a linear shape, and a plurality of recesses 10c may be arranged in a dot configuration, for example. The material of the current collector 10 is aluminum (Al), copper (Cu), or the like, for example.

The first layer 20 is provided on the current collector 10. The first layer 20 includes active material bodies 21 (first active material bodies), binders 22 (first binders), and conductive bodies 23 (first conductive bodies). The active material body 21 may be referred to as a negative electrode active material body 21.

The average particle size of the active material body 21 is 5 μm to 10 μm, for example. Here, the average particle size in the embodiment is defined by the volume average particle size, for example. Since the depth d1 of the plurality of recesses 10c is 10% or more of the total thickness T3 of the thickness T1 of the current collector 50 and the thickness T2 of the first layer 20, a plurality of active material bodies 21 are formed in the recess 10c.

The binder 22 is a binder connecting adjacent ones of the plurality of active material bodies 21. The conductive body 23 is provided around the active material body 21; thereby, lithium ions ($Li^+$) or electrons can circulate around to the active material bodies 21 uniformly.

The separator 40 is provided in the plurality of recesses 10c via the first layer 20. The separator 40 is provided also on the first layer 20 other than the first layer 20 provided in the plurality of recesses 10c. The separator 40 includes a plurality of fibers 41. The line width of one fiber 41 is of the nano-order. The thickness of the separator 40 is 10 μm or less. The fiber 41 is formed in the plurality of recesses 10c by the electrospinning method (ES method) (described later). By the separator 40 being formed by the electrospinning method, the separator 40 is formed along the concave-convex configuration of the first layer 20. In other words, the separator 40 is formed on the first layer 20 with good step coatability.

In the lithium-ion secondary battery 1, the positive electrode 70 faces the negative electrode 30 across the separator 40. In the positive electrode 70, the second layer 60 is provided on the current collector 50. The second layer 60 includes active material bodies 61 (second active material bodies), binders 62 (second binders), and conductive bodies 63 (second conductive bodies). The active material body 61 may be referred to as a positive electrode active material body 61. The thickness of the current collector 50 is 40 μm or less, for example. The thickness of the second layer 60 is 40 μm or less, for example. The material of the current collector 50 is aluminum (Al), copper (Cu), or the like, for example.

The average particle size of the active material body 61 is 5 μm (micrometers) to 10 μm, for example. The binder 62 is a binder connecting adjacent ones of the plurality of active material bodies 61. The conductive body 63 is provided around the active material body 61; thereby, lithium ions ($Li^+$) or electrons diffuse to the active material bodies 61 uniformly.

In the lithium-ion secondary battery 1, by the separator 40 in a fibrous form being provided between the negative electrode 30 and the positive electrode 70, an electrical short circuit between the negative electrode 30 and the positive electrode 70 is prevented.

As the material of the active material body (negative electrode active material) 21, a metal oxide, a metal sulfide, a metal nitride, an alloy, and the like are given, for example.

As the metal oxide, tungsten oxide such as $WO_3$, amorphous tin oxide such as $SnB_{0.4}P_{0.6}O_{3.1}$, tin silicon oxide such as $SnSiO_3$, silicon oxide such as SiO, lithium titanate of the spinel structure such as $Li_{4+x}Ti_5O_{12}$, and the like are given, for example.

The metal oxide is lithium titanium oxide (lithium titanium composite oxide) such as lithium titanate, for example. The metal sulfide is lithium sulfide such as $TiS_2$, molybdenum sulfide such as $MoS_2$, or iron sulfide such as $FeS$, $FeS_2$, and $Li_xFeS_2$, for example. The metal nitride is lithium cobalt nitride such as $Li_xCo_yN$ ($0<x<4$, $0<y<0.5$) or the like, for example. Lithium titanate is preferable in terms of cycle performance. This is because lithium titanate has a lithium occlusion potential of approximately 1.5 V and is an electrochemically stable material with respect to an aluminum foil current collector or an aluminum alloy foil current collector. Other than these, lithium carbide ($LiC_6$) and the like may be used.

As the material of the active material body (positive electrode active material) 61, an oxide, a sulfide, a polymer, etc. are given.

As the oxide, manganese dioxide ($MnO_2$), iron oxide, copper oxide, nickel oxide, lithium manganese composite oxide such as $Li_xMn_2O_4$ and $Li_xMnO_2$, lithium nickel composite oxide such as $Li_xNiO_2$, lithium cobalt composite oxide such as $Li_xCoO_2$, lithium nickel cobalt composite oxide such as $LiNi_{1-y}Co_yO_2$, lithium manganese cobalt composite oxide such as $LiMn_yCo_{1-y}O_2$, lithium manganese nickel composite oxide of the spinel structure such as $Li_xMn_{2-y}Ni_yO_4$, lithium phosphorus oxide having the olivine structure such as $Li_xFePO_4$, $Li_xFe_{1-y}Mn_yPO_4$, and $Li_xCoPO_4$, iron sulfate such as $Fe_2(SO_4)_3$, vanadium oxide such as $V_2O_5$, and the like are given, for example. x and y are each in a range of 0 to 1.

As the polymer, an electrically conductive polymer material such as polyaniline and polypyrrole, a disulfide-based polymer material, and the like are given. Other than these, sulfur (S), carbon fluoride (CF), and the like may be used.

As the binders 22 and 62, polytetrafluoroethylene (PTFE), polyvinylidene fluoride (PVdF), fluorine-based rubber, styrene-butadiene rubber, and the like are given, for example.

As the conductive bodies 23 and 63, acetylene black, carbon black, coke, carbon fiber, graphite, and the like are given.

The material of the fiber 41 is an insulator, and has flexibility. The material of the fiber 41 includes at least one of a polyamideimide and polyvinylidene fluoride, for example.

Although FIG. 1A to FIG. 2 illustrate one set of the negative electrode 30, the positive electrode 70, and the separator 40, the embodiment is not limited to this example. For example, a set of the negative electrode 30, the positive electrode 70, and the separator 40 may be stacked in plural; or the negative electrode 30 and the positive electrode 70 may be alternately arranged and the separator 40 may be provided between the negative electrode 30 and the positive electrode 70.

Operations of the lithium-ion secondary battery 1 will now be described.

As shown in FIG. 2, when the lithium-ion secondary battery 1 is charged, a negative potential (or the ground potential) is applied to the positive electrode 70, and a positive potential is applied to the negative electrode 30. During charging, lithium ions ($Li^+$) are released from the active material body 61 on the positive electrode 70 side, and move to the negative electrode 30 side. At this time, electrons ($e^-$) released from lithium flow to the negative electrode 30 side through a current path 80. The lithium ion ($Li^+$) binds to the active material body 21 on the negative electrode 30 side.

On the other hand, when the lithium-ion secondary battery 1 is discharged, lithium ions ($Li^+$) are released from the active material body 21 on the negative electrode 30 side, and move to the positive electrode 70 side. At this time, electrons ($e^-$) released from lithium flow to the positive electrode 70 side through the current path 80. The lithium ion ($Li^+$) binds to the active material body 61 on the positive electrode 70 side.

In the lithium-ion secondary battery 1 according to the first embodiment, the recess 10c is provided on the surface of the current collector 10, and the first layer 20 is formed on the surface of the current collector 10. The first layer 20 is formed in the recess 10c and in portions other than the recess 10c. Accordingly, also the first layer 20 has a concave-convex configuration. In other words, the negative electrode 30 has a concave-convex configuration in which the concave-convex configuration of the current collector 10 is reflected. Thereby, the surface area of the negative electrode 30 is increased greatly as compared to the surface area of a negative electrode having no concave-convex configuration. The surface of the negative electrode 30 is a portion where lithium ions ($Li^+$) go in and out most. By increasing the area of such a portion, the output of the lithium-ion secondary battery is increased greatly.

As the surface area of the negative electrode 30 decreases, the area of the place on the active material body where lithium ions ($Li^+$) do not arrive increases, for example. In such a place, a defect that does not function as the active material may occur in the place on the active material body where lithium ions ($Li^+$) do not arrive. In the first embodiment, the surface area of the negative electrode 30 is increased to avoid the occurrence of such a defect.

The separator 40 includes the fiber 41 of the nano-order. The fiber 41 is an insulator. The separator 40 is provided on the first layer 20 having a concave-convex configuration with high step coatability. Thereby, the insulation between the positive electrode 70 and the negative electrode 30 is ensured with reliability.

There is a gap between adjacent ones of the plurality of fibers 41. By the gap, during charging and discharging, lithium ions (Li$^+$) can pass through the gap between adjacent ones of the plurality of fibers 41 with good efficiency. In other words, in the separator 40 according to the first embodiment, the area of the place through which lithium ions (Li$^+$) can pass is increased greatly as compared to the case where a plurality of holes that allow lithium ions (Li$^+$) to pass through them are provided in a film-like separator. Thereby, the lithium-ion secondary battery arrives at the electrode more uniformly.

Second Embodiment

Figure 3:
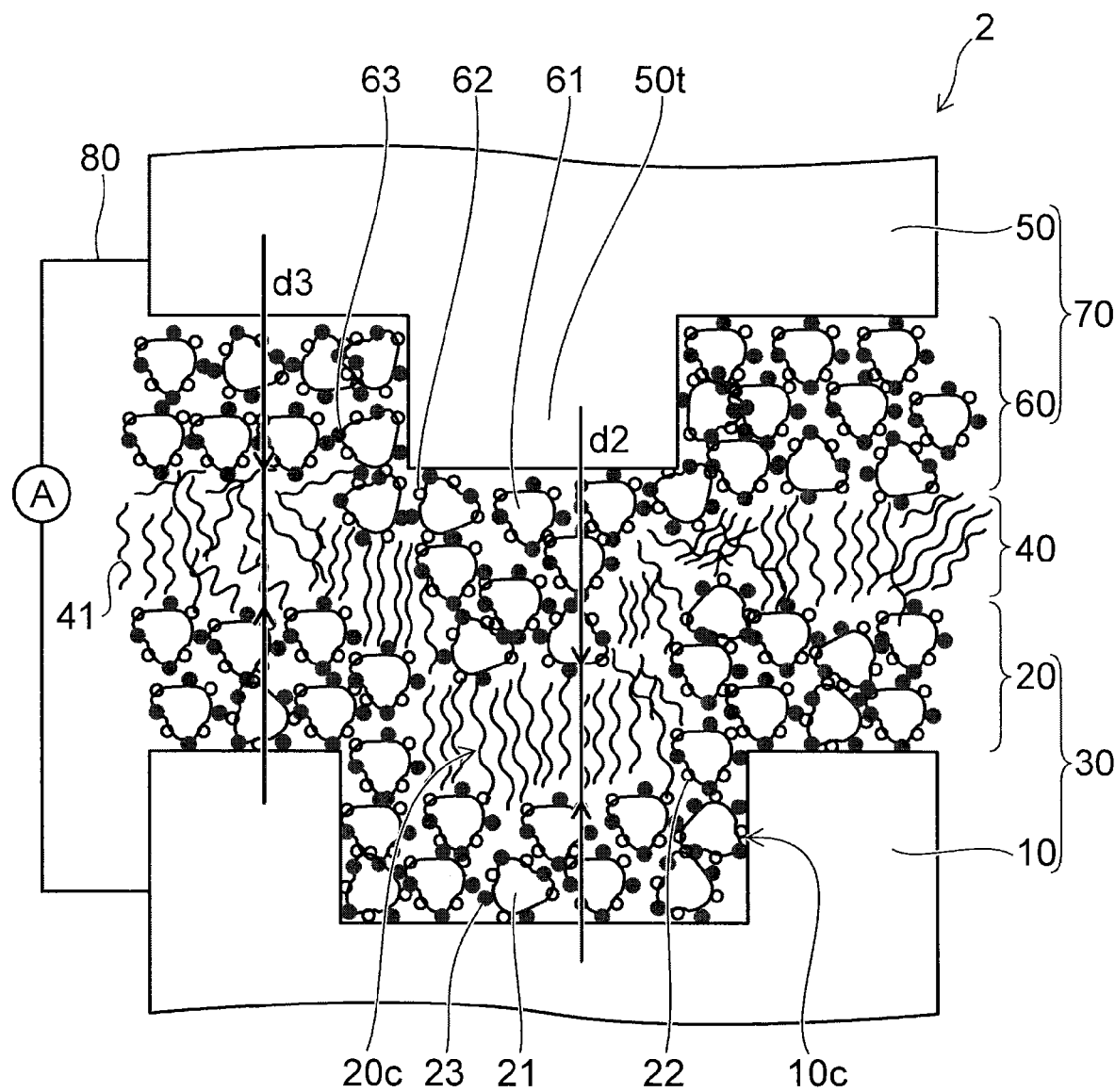
FIG. 3 is a schematic cross-sectional view of a lithium-ion secondary battery according to a second embodiment.

FIG. 3 is a schematic cross-sectional view of a lithium-ion secondary battery according to a second embodiment.

In the positive electrode 70 of a lithium-ion secondary battery 2 according to the second embodiment, the current collector 50 has a plurality of protrusions 50$t$ on its surface. The plurality of protrusions 50$t$ are formed by the imprint method, the press method, or the like, for example. When the surface of the current collector 50 is viewed perpendicularly to the surface of the current collector 50, the pitch of the plurality of protrusions 50$t$ is 10 mm or less. When the surface of the current collector 50 is viewed perpendicularly to the surface of the current collector 50, each of the plurality of protrusions 50$t$ is in a linear shape so as to correspond to the recess 10$c$ described above. Each of the plurality of protrusions 50$t$ does not need to be in a linear shape, and a plurality of protrusions 50$t$ may be arranged in a dot configuration, for example.

The separator 40 is provided between the first layer 20 and the second layer 60. The plurality of recesses 10$c$ of the first current collector 10 and the plurality of protrusions 50$t$ of the second current collector 50 face each other across the separator 40, the first layer 20, and the second layer 60. The first layer 20 provided on the current collector 10 has a recess 20$c$ (a second recess) in the position of each of the plurality of recesses 10$c$. This is because the first layer 20 is formed with a uniform thickness on the current collector 10 and therefore the concave-convex configuration of the current collector 10 is reflected on the first layer 20. The second layer 60 provided on each of the plurality of protrusions 50$t$ is inserted in the recess 20$c$.

The lithium-ion secondary battery 2 exhibits similar operation and effect to the lithium-ion secondary battery 1 according to the first embodiment. In addition, in the lithium-ion secondary battery 2, the second layer 60 provided on each of the plurality of protrusions 50$t$ is inserted in the recess 20$c$.

Thereby, the difference between the distance d2 between the first layer 20 and the second layer 60 in a position where the protrusion 50 and the recess 10$c$ face each other and the distance d3 between the first layer 20 and the second layer 60 in other than the position of the facing mentioned above is made smaller. As a result, the travel distance of the lithium ion (Li$^+$) between the negative electrode 30 and the positive electrode 70 is made more uniform. In other words, in the lithium-ion secondary battery 2, the difference between the speed at which the lithium ion (Li$^+$) arrives at the active material body and the speed at which the electron arrives at the current collector is made smaller. That is, in the lithium-ion secondary battery 2, the charging and discharging of the lithium-ion secondary battery are enabled while the electrode is used with better efficiency.

Third Embodiment

Figure 4A:
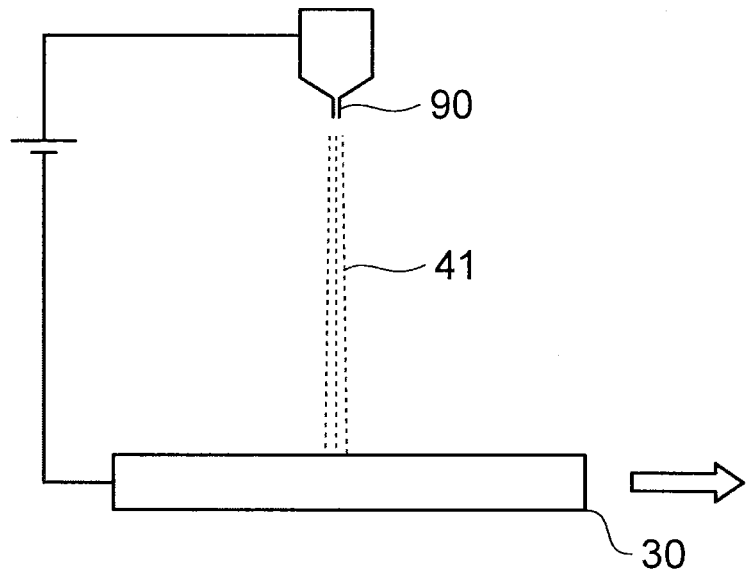
FIG. 4A and FIG. 4B are schematic views showing a method for manufacturing a separator.
Figure 4B:
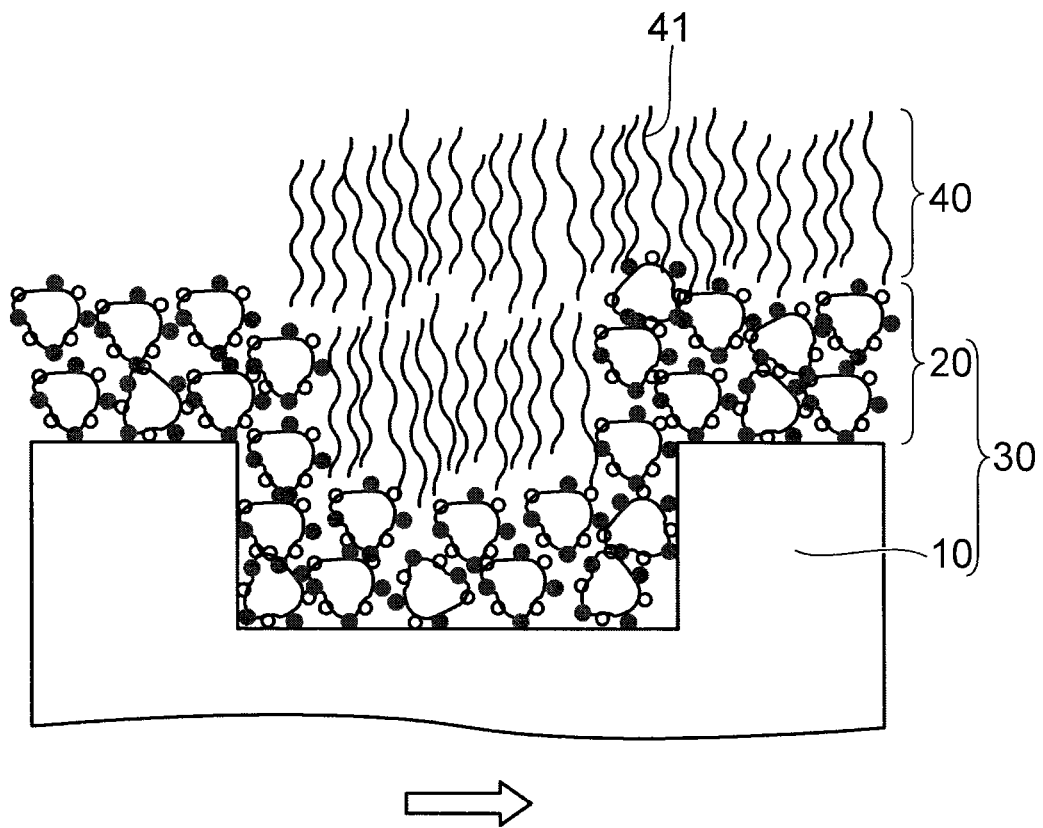

FIG. 4A and FIG. 4B are schematic views showing a method for manufacturing a separator.

The separator 40 is formed on the negative electrode 30 (or the positive electrode 70) by the ES method. FIG. 4A and FIG. 4B show the manner in which the separator 40 is formed on the negative electrode 30 by the ES method, as an example.

As shown in FIG. 4A, fibers 41 or the material of the fiber 41 is put in a nozzle 90, and a high voltage (for example, several thousand volts) is applied between the nozzle 90 and the negative electrode 30, for example. By the strong electrolysis between the nozzle 90 and the negative electrode 30, the fiber 41 is jetted from the nozzle 90, and the fiber 41 charged with a positive potential is accelerated toward the negative electrode 30 charged with a negative potential. After that, the fiber 41 provided with high energy by electrolysis adheres to the negative electrode 30. During the formation of the fiber 41, the negative electrode 30 is slid in the direction of the arrow. Thereby, the fiber 41 (the separator 40) is formed on the first layer 20 with good step coatability.

Although the embodiments are described above with reference to the specific examples, the embodiments are not limited to these specific examples. That is, design modification appropriately made by a person skilled in the art in regard to the embodiments is within the scope of the embodiments to the extent that the features of the embodiments are included. Components and the disposition, the material, the condition, the shape, and the size or the like included in the specific examples are not limited to illustrations and can be changed appropriately.

"On" in "regio A is provided on regio B" means the case where the region A contacts the region B and the region A is provided on the region B and the case where the region A does not contact the region B and the region A is provided above the region B. When a stacking order of the regio A and the region B is inversed, the situation is "the region A is provided below the region B", however also in this case, the expression "the region A is provided on the region B" may be used. This is because of invariance of the stacked structure before and after the inversion in spite of inverting the stacking order of the regio A and the regio B.

The components included in the embodiments described above can be combined to the extent of technical feasibility and the combinations are included in the scope of the embodiments to the extent that the feature of the embodiments is included. Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A lithium-ion secondary battery comprising:
   a first current collector having a plurality of first recesses on a surface of the first current collector;

a first layer provided on the first current collector, the layer including a first active material body, a first binder, and a first conductive body; and a separator provided in the first recesses formed on the first layer and including a fiber.

2. The battery according to claim 1, further comprising:

a second current collector having a plurality of protrusions on a surface of the second current collector; and a second layer provided on the second current collector, the second layer including a second active material body, a second binder, and a second conductive body.

3. The battery according to claim 2, wherein the separator is provided between the first layer and the second layer and the first recesses of the first current collector and the protrusions of the second current collector face each other across the separator, the first layer, and the second layer.

4. The battery according to claim 3, wherein the first layer provided on the first current collector has a second recess in a position of each of the first recesses and a second layer provided on each of the protrusions is inserted in the second recess.

5. The battery according to claim 3, wherein the separator is provided on the first layer other than the first layer provided in the recesses.

6. The battery according to claim 3, wherein a pitch of the recesses is 10 mm or less when the surface of the first current collector is viewed perpendicularly to the surface of the first current collector.

7. The battery according to claim 2, wherein the first layer provided on the first current collector has a second recess in a position of each of the first recesses and a second layer provided on each of the protrusions is inserted in the second recess.

8. The battery according to claim 2, wherein the separator is provided on the first layer other than the first layer provided in the recesses.

9. The battery according to claim 2, wherein a pitch of the recesses is 10 mm or less when the surface of the first current collector is viewed perpendicularly to the surface of the first current collector.

10. The battery according to claim 1, wherein the separator is provided on the first layer other than the first layer provided in the recesses.

11. The battery according to claim 10, wherein a pitch of the recesses is 10 mm or less when the surface of the first current collector is viewed perpendicularly to the surface of the first current collector.

12. The battery according to claim 1, wherein a pitch of the recesses is 10 mm or less when the surface of the first current collector is viewed perpendicularly to the surface of the first current collector.

13. The battery according to claim 1, wherein each of the recesses is in a linear shape when the surface of the first current collector is viewed perpendicularly to the surface of the first current collector.

14. The battery according to claim 1, wherein a depth of the recesses is 10% or more of a thickness summing a thickness of the first current collector and a thickness of the first layer.

15. The battery according to claim 1, wherein a material of the fiber includes at least one of a polyamideimide and polyvinylidene fluoride.

16. The battery according to claim 1, wherein the fiber is formed on the first layer by an electrospinning method.

* * * * *